United States Patent [19]

Tanaka

[11] Patent Number: 4,974,971
[45] Date of Patent: Dec. 4, 1990

[54] SMALL-SIZED LINEAR MOTION GUIDE ASSEMBLY

[75] Inventor: Kazuhiko Tanaka, Tokyo, Japan

[73] Assignee: Nippon Thompson Co., Ltd., Tokyo, Japan

[21] Appl. No.: 412,969

[22] Filed: Sep. 26, 1989

[30] Foreign Application Priority Data

Sept. 26, 1988 [JP] Japan .................... 63-238934

[51] Int. Cl.⁵ .................................. F16C 29/06
[52] U.S. Cl. .............................. 384/45; 384/43
[58] Field of Search .................... 384/43–45; 464/168

[56] References Cited

U.S. PATENT DOCUMENTS

| 3,398,999 | 8/1968 | Halvorsen | 384/45 |
| 3,934,946 | 1/1976 | Burr et al. | 384/45 |
| 4,433,876 | 2/1984 | Mottate | 384/45 |
| 4,616,886 | 10/1986 | Teramachi | 384/45 |
| 4,799,803 | 1/1989 | Tanaka | 384/43 |

FOREIGN PATENT DOCUMENTS 133636 9/1988 Japan .

Primary Examiner—Thomas R. Hannon
Attorney, Agent, or Firm—Skjerven, Morrill, MacPherson, Franklin & Friel

[57] ABSTRACT

An endless rolling contact linear motion guide assembly includes a rail extending straight over a predetermined length, a slider movably mounted on the rail and a plurality of rolling members for providing a rolling contact between the rail and the slider. The slider is provided with an endless circulating path having a load path section, a return path section and a pair of curved connecting path sections, each connecting the corresponding ends of the load and return path sections. The rail is formed with an inner guide groove and the slider is formed with an outer guide groove located opposite to the inner guide groove so that a combination of the inner and outer guide grooves defines the load path section. The outer guide groove has a Gothic arch shape having a pair of upper and lower curved surfaces, each of which is in contact with the rolling member at one contact point. A contact angle defined between a vertical line passing through the center of the rolling member and a straight line passing through the center of the rolling member and a contact point between the rolling member and each of the upper and lower curved surfaces of the outer guide groove is set at an angle larger than 45° and preferably approximately at 50°.

7 Claims, 2 Drawing Sheets

α > 45

SMALL-SIZED LINEAR MOTION GUIDE ASSEMBLY

BACKGROUND OF THE INVENTION

1. Field of the Invention

This invention generally relates to a linear motion guide assembly and in particular to a small-sized rolling contact type linear motion guide assembly using a plurality of rolling members. More specifically, the present invention relates to an endless linear motion guide assembly.

2. Description of the Prior Art

A linear motion guide assembly is well known in the art and it generally includes a rail extending over a length, a slider mounted on the rail for movement along the rail and a plurality of rolling members for providing a rolling contact between the rail and the slider. In such a linear motion guide assembly, a guide rail is provided with a pair of inner guide grooves on opposite sides and a slider is provided with a pair of outer guide grooves each of which is located opposite to the corresponding one of the pair of inner guide grooves of the rail. And, a plurality of rolling members, typically balls, are interposed between the rail and the slider to provide a sliding contact between them. In an endless linear motion rolling contact guide assembly, a slider is typically provided with a pair of endless circulation path which includes a load path section, a return path section and a pair of curved connecting sections, each connecting the corresponding ends of the load and return path sections. In this case, the load path section is defined by the outer guide groove of the slider and a corresponding portion of the inner guide groove of the rail. The rolling members are provided in the endless circulation path so that the rolling members roll along the endless circulation path as the slider moves along the rail, whereby those rolling members located in the load path section provide a rolling contact between the slider and the rail.

In such a linear motion guide assembly, the balls are maintained in position only when the assembly is maintained in an assembled state. For example, when the slider is separated from the rail, the rolling members will fall off. In order to prevent this from occurring, a stopper is provided at each end of the rail to prevent the slider from slipping away from the rail. However, such a linear motion guide assembly is rather difficult to assemble because the rolling members tend to fall off. Under the circumstances, there has been proposed to provide a retainer plate in the slider to prevent the rolling members from falling off through an opening defined at the load path section when disassembled. However, the provision of such a retainer plate is not always advantageous because it tends to increase the sliding resistance of the rolling members and create a hindrance to make the entire structure smaller. Moreover, difficulty is normally encountered in fabricating and assembling such a linear motion guide assembly having a retainer plate.

SUMMARY OF THE INVENTION

In accordance with the present invention, there is provided a linear motion guide assembly comprising a rail extending over a length, a slider movably mounted on said rail and a plurality of rolling members. The rail is preferably rectangular or square in shape having a top surface and a pair of side surfaces An inner guide groove is formed in each of the side surfaces of the rail extending in parallel with the longitudinal axis thereof. The slider has a main section and a pair of leg sections depending from the main section to thereby define a generally U-shaped cross section. Each of the leg sections has a inner surface which faces a corresponding one of the side surfaces of the rail and is formed with an outer guide groove. When assembled, the outer guide groove of the slider is located opposite to a corresponding inner guide groove of the rail.

The slider is, typically, provided with a pair of endless circulation paths each of which includes a load path section, a return path section and a pair of curved connecting sections, each of which connects the corresponding ends of the load and return path sections. When assembled, the load path section of the endless circulation path is defined by the outer guide groove of the slider and a corresponding portion of the inner guide groove of the rail which is located opposite to the outer guide groove of the slider. The rolling members, typically balls, are provided in each of the endless circulation paths, so that a rolling contact is provided between the rail and the slider through those rolling members located in each of the load path sections.

In accordance with the distinctive features of the present invention, the outer guide groove of the slider has a particular cross sectional shape. Typically, the outer guide groove is Gothic arch groove. The depth of the outer guide groove is larger than the characteristic size, i.e., diameter in the case of balls, of the rolling members so that the center of each of the balls is located inside the a Gothic arch groove. An inwardly projecting ridge is formed at the top and bottom edge of the Gothic arch groove and the shortest distance between the tip ends of the oppositely located inwardly projecting ridges is smaller than the diameter of the balls. As a result, the balls are maintained in position in the outer guide groove and they are prevented from falling off through a window defined at the mouth of the outer guide groove of the slider.

More specifically, the outer guide groove is so shaped that the balls are in contact therewith at two points. That is, since the outer guide groove is of the Gothic arch shape, it includes two curved surfaces, each of which is preferably defined by a predetermined radius of curvature. Thus, the balls are in contact with the outer guide groove at two points, i.e., one for each of the two curved surfaces of the Gothic arch groove. Preferably, the inner guide groove is also of the Gothic arch shape so that each of the balls is also in contact with the inner guide groove at two points. In total, each of the balls are in contact with the inner and outer guide grooves at four points when located in the load path section of the endless circulation path. Let a contact angle be defined as an angle between a vertical line passing through the center of a ball located in the load path section and a line extending straight between the center of the ball and a contact point between the ball and the upper curved surface of the outer guide groove of the slider. This contact angle should be set at more than 45° and preferably approximately at 50°.

With this structure, the contact points between the ball and the outer guide groove may be located closer together, which then allows to increase a load bearing capacity in the horizontal direction. Accordingly, the overall integrity of the assembly may be increased and this structure allows to provide an increased ease of manufacture, so that the resulting structure may have high precision. Moreover, when the contact angle is set at more than 45°, even if the inner guide groove must be made relatively shallow because of the provision of the deeper outer guide groove, the inner guide groove can provide a sufficient support to the balls in the load path section since the contact points between the balls and the inner guide groove is set closer together.

It is therefore a primary object of the present invention to obviate the disadvantages of the prior art as described above and to provide an improved linear motion guide assembly.

Another object of the present invention is to provide an improved linear motion guide assembly small in size, but rigid in structure.

A further object of the present invention is to provide an improved linear motion guide assembly easy to manufacture and with high precision.

A still further object of the present invention is to provide an improved rolling contact type endless linear motion guide assembly which allows to prevent its rolling members from falling off unintentionally even when disassembled.

Other objects, advantages and novel features of the present invention will become apparent from the following detailed description of the invention when considered in conjunction with the accompanying drawings.

DESCRIPTION OF THE PREFERRED EMBODIMENTS

Figure 1:
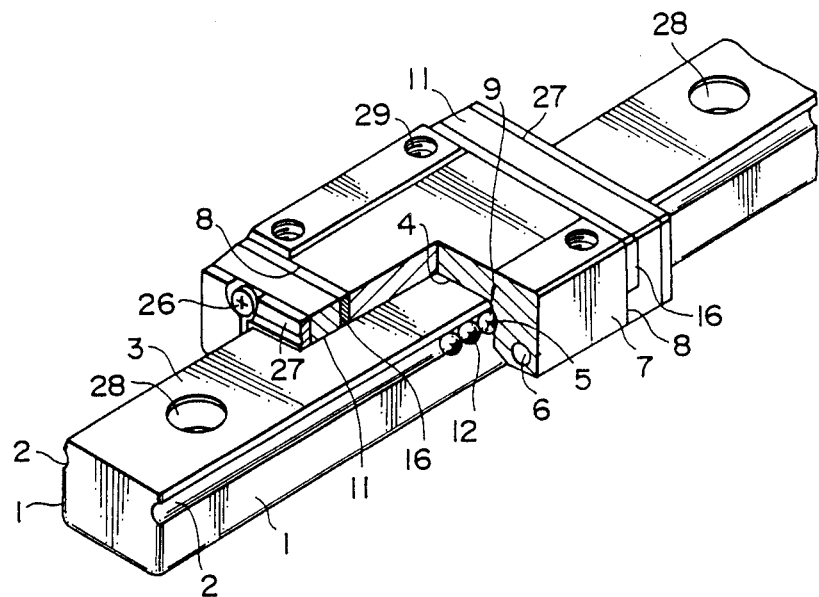
FIG. 1 is a schematic illustration showing in perspective with a part broken away a linear motion rolling contact guide assembly constructed in accordance with one embodiment of the present invention.
Figure 2:
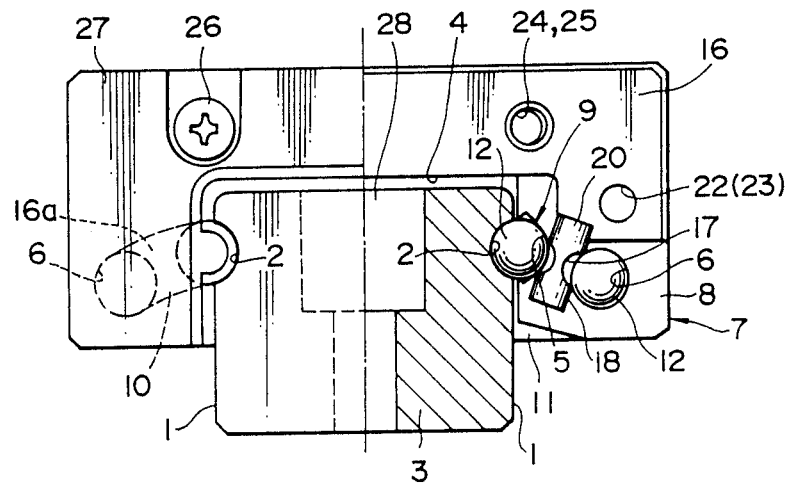
FIG. 2 is a schematic illustration showing partly in transverse cross sectional view and partly in end view the linear motion guide assembly of FIG. 1.

Referring now particularly to FIGS. 1 and 2, there is schematically shown a linear motion guide assembly constructed in accordance with one embodiment of the present invention. As shown, the present linear motion guide assembly is of the rolling contact type endless type and it generally includes a rail 3 extending straight over a predetermined length, a slider mounted on the rail 3 movably therealong, and a plurality of balls 12 to provide a rolling contact between the rail 3 and the slider. The rail 3 is elongated in shape and it is generally rectangular in shape so that it includes a flat top surface, a flat bottom surface and a pair of opposite side surfaces 1, 1. Each of the side surfaces 1 is formed with an inner guide groove 2 which extends straight in parallel with the center line of the rail 3. In the illustrated embodiment, the inner guide groove 2 has a Gothic arch shape as will become more clear later and thus it includes an upper curved surface portion and a lower curved surface portion. The rail 3 is also formed with a mounting hole 28 at each end so that the rail 3 may be fixedly attached to a desired object using bolts or the like.

Figure 4:
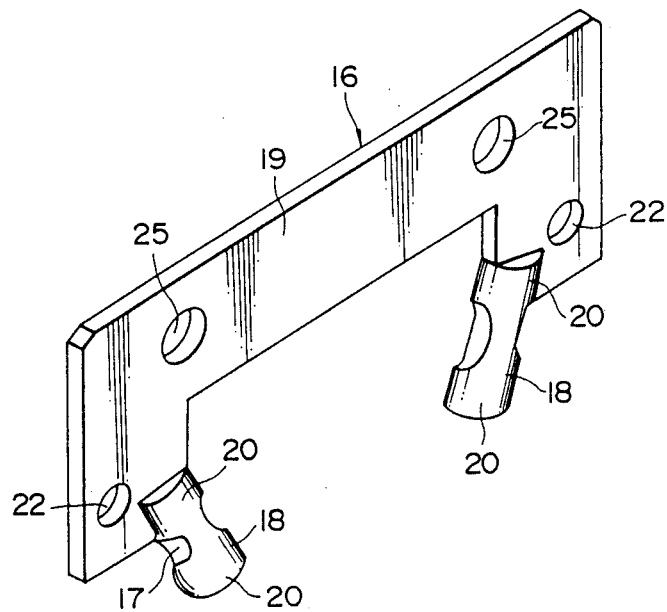
FIG. 4 is a schematic illustration showing in perspective a spacer plate provided in the linear motion guide assembly shown in FIGS. 1 and 2.

Slidably mounted on the rail 3 is the slider which generally includes a casing or main body 7 comprised of a flat base section and a pair of leg sections each depending from a corresponding side of the base section, thereby defining an inverted U-shaped cross section. Each of the leg sections of the main body 7 is located adjacent to a corresponding side surface 1 of the rail 3 so that the main body 7 of the slider appears to straddle the rail 3. The slider also includes a spacer plate 16, which will be described more in detail later with reference to FIG. 4, located at each end of the main body 7. An end plate 11 is fixedly attached to each end of the main body 7 with the spacer plate 16 sandwiched therebetween. A seal 27 is fixedly attached to the end plate 11 to seal holes formed in the end plate 11. The main body 7 has a bottom surface 4 which faces and is located adjacent to the top surface of the rail 3.

The slider is provided with a pair of endless circulating paths each of which includes a load path section 9, a return path section 6 and a pair of curved connecting path sections 10 each of which connects the corresponding ends of the load and return path sections 9 and 6. The slider or main body 7 is formed with an outer guide groove 5 at an inner side surface of its leg section and the outer guide groove 5 defines the load path section 9 together with a corresponding portion of the inner guide groove 2 of the rail 3. As will be described more in detail later, the outer guide groove 5 of the slider has also a Gothic arch shape and thus it is generally defined by a pair of upper and lower curved surfaces. A plurality of balls 12 is provided in each of the endless circulating paths so that those balls located in each of the load path sections 9 provide a rolling contact between the rail 3 and the slider. In the illustrated embodiment, the outer guide groove 5 and the return path section 6 are formed in each of the leg sections of the main body 7 and the curved connecting path section 10 is formed in each of the end plates 11. The main body 7 is also formed with a plurality of mounting threaded holes 29 at its top surface so that the slider or main body 7 may be fixedly attached to any desired object.

As best shown in FIG. 2, the balls 12 roll along the load path section 9 between the rail 3 and the slider and the balls 12 move into the return path section 12 through one of the curved connecting path section 10. Then, the balls 12 again move into the load path section 9 from the return path section 6 through the other curved connecting path section 10. In this manner, balls 12 will roll along the endless circulation paths indefinitely so that the slider may move along the rail 3 over its entire length in either direction. The curved connecting path section 10 is, in fact, defined between a portion of the spacer plate 16 and a recess formed in the end plate 11. Described more in detail in this respect with particular reference to FIG. 4, the spacer plate 16 includes an inverted-U-shaped section 19 and a pair of inclined projections 18 each of which projects downward section 19. The included projection 18 is generally columnar in structure and it is narrowed at its center to thereby define a pair of top and bottom fat portions 20. Although not shown specifically, the end plate 11 is formed with a pair of upper and lower notches above and below the recess for defining the curved connecting path section 10, respectively, to thereby receive the upper and lower fat portions 20 of the projection 18 when assembled. Thus, the surface of the recess 10 and the surface of the narrowed section 17 of the inclined projection define the curved connecting path section 10 when assembled. The spacer plate 16 is also formed with a pair of positioning holes 22 and a pair of mounting holes 25. The spacer plate 16 may be set in position by bolting the end plate 11 against one end of the main body 7 using a bolt 26 passing through the mounting hole 25. The spacer plate 16 is described in the Japanese Utility Model Laid-open Publication No. 63-133636, which has been assigned to the assignee of this application.

As shown in FIG. 2, the return path section 6 is located lower in position than the load path section 9. Thus, the mounting hole 29 may be formed relatively deeper. Moreover, the curved connecting path section 10 is also defined to be somewhat curved when viewed in the longitudinal direction as shown in FIG. 2. Such a structure allows to provide a smoother rolling movement of the balls 12 along the endless circulation path.

Figure 3:
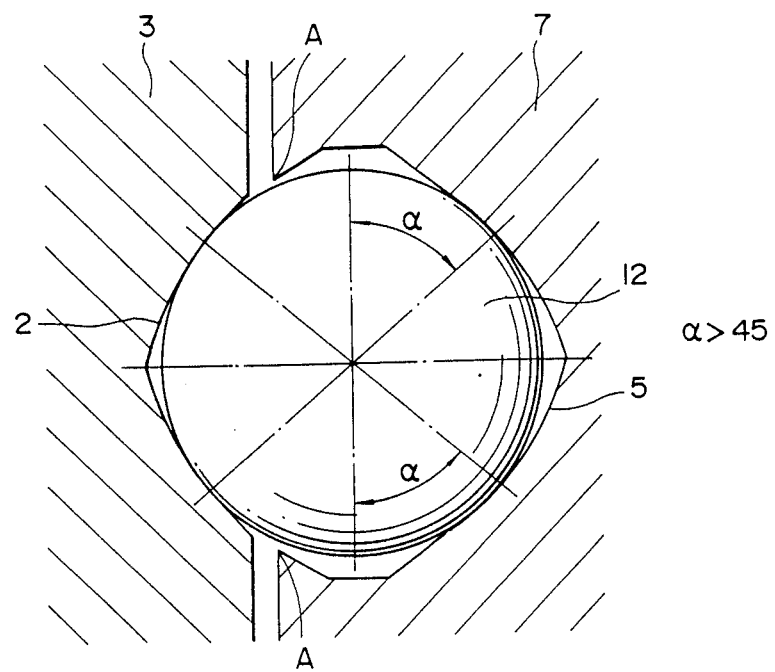
FIG. 3 is a schematic illustration showing a rolling contact condition between a ball and a load path section of an endless path section in the present linear motion guide assembly shown in FIGS. 1 and 2.

FIG. 3 schematically illustrates the basic feature of the present invention incorporated in the present linear motion guide assembly shown in FIGS. 1 and 2. As shown in FIG. 3, the basic feature of the present invention resides in a particular structure of the load path section defined between the slider or main body 7 and the rail 3. The load path section is defined by the inner guide groove 2 of the rail 3 and the outer guide groove 5 of the slider or main body 7. Each of the inner and outer guide grooves 2 and 5 has a Gothic arch shape defined by a pair of upper and lower curved surfaces. In the illustrated embodiment, each of the upper and lower curved surfaces is defined by a radius of curvature which is larger than the diameter of the ball 12 so that the ball 12 makes a contact with each of the upper and lower curved surfaces at one point. As a result, the ball 12 is in rolling contact with the inner and outer guide grooves 2 and 5 at four points in total.

It is to be noted that the Gothic arch shape of each of the inner and outer guide grooves 2 and 5 is so defined that a contact angle alpha is larger than 45° and preferably set approximately at 50°. The contact angle alpha is defined as an angle between a vertical line passing through the center of the ball 12 and a straight line passing through the center of the ball 12 and a contact point between the ball 12 and the upper curved surface of either of the inner and outer guide grooves 2 and 5. With this structure, the contact points between the ball 12 and the upper and lower curved surfaces of the inner or outer guide grooves 2 or 5 are set closer together so that there is provided an increased load bearing capability in the horizontal direction with a corresponding reduction in the load bearing capability in the vertical direction. As a result of an extensive study made by the present inventor, it has been found that the contact angle should be set larger than 45°and preferably approximately at 50° in many instances.

The outer guide groove 5 has a larger depth so that the ball 12 is substantially received in the outer guide groove 5 with the center of the ball 12 located inside the space defined by the outer guide groove 5. The outer guide groove 5 is also formed with a pair of upper and lower inwardly projecting ridges each having a tip end A. The shortest distance between the tip ends A of the pair of inwardly projecting ridges is set to be smaller than the diameter of the ball 12. As a result, the ball 12 is prevented from falling off the outer guide groove 5 and maintained properly in position. Such a structure is particularly advantageous when the slider is disassembled from the rail 3 for some reason because the balls 12 do not fall off the slider. In addition once the balls 12 are set in the endless circulating paths of the slider, they are maintained in the endless circulating paths so that assemblage of the present linear motion guide assembly is greatly facilitated.

In the structure shown in FIG. 3, since the outer guide groove 5 is made deeper to substantially receive therein the ball 12, the inner guide groove 2 must be made correspondingly shallow. However, in accordance with the present invention, since the contact angle alpha is set to be larger than 45° and preferably at 50° or its vicinity, the ball 12 is still supported by the shallow inner guide groove 2 sufficiently. If the contact angle alpha is relatively small, i.e., 45° or smaller, then the contact point between the ball 12 and the inner guide groove 2 may be located sufficiently close to the side surface of the rail 3, so that the ball 12 may be derailed or roll out of the inner guide groove 2.

Moreover, since the contact points between the ball 12 and the outer guide groove 5 are set closer together toward the horizontal line passing through the center of the ball 12, it provides for increased ease in processing the upper and lower surfaces of the outer guide groove 5. That is, even if the outer guide groove 5 is defined to be somewhat deeper so as to enclose the ball 12 sufficiently, the critical sections of the upper and lower guide surfaces may be finished at high precision because of increased accessibility from outside. In manufacture, the casing or main body 7 is first processed to a near finish dimension through drawing and forging. Then, broaching is applied to form the outer guide groove 5 having a desired shape as shown in FIG. 3, followed by a step of finishing the upper and lower surfaces of the outer guide groove 5 through grinding. Such a process can be easily applied in the structure of the present invention because the critical portions, where the ball 12 comes into rolling contact, of the outer guide groove 5 are located closer to the center of the groove 5.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:
1. A linear motion guide assembly comprising:
   a rail extending over a predetermined length and provided with first guiding means extending along said rail;
   a slider movably mounted on said rail, said slider including second guiding means which is located opposite to said first guiding means at least partly;
   a plurality of rolling members interposed between said first and second guiding means to thereby provide a rolling contact between said slider and said rail so that said slider may move along said rail;
   whereby a contact angle defined between a vertical line passing through the center of said rolling member and a straight line passing through the center of said rolling member and a contact point between said rolling member and said second guiding means is set to be larger than 45°; and
   wherein said outer guide groove is sufficiently deep to receive therein said rolling members such that the center of each of the rolling members is located in a space defined by said outer guide groove and said outer guide groove is formed with a pair of upper and lower inwardly projecting ridges, whereby a distance between said upper and lower inwardly projecting ridges is shorter than a characteristic size of said rolling member to thereby prevent said rolling member from falling out through a window defined between the upper and lower inwardly projecting ridges.

2. The assembly of claim 1, wherein said contact angle is set to be approximately at 50°.

3. The assembly of claim 1, wherein said first guiding means including an inner guide groove having a particular shape and said second guiding means includes an outer guide groove located opposite to a corresponding portion of said inner guide groove, said outer guide groove having a Gothic arch shape including a pair of upper and lower curved surfaces, whereby said rolling member is in contact with each of said pair of upper and lower curved surfaces at one contact point.

4. The assembly of claim 3, wherein said inner guide groove also has a Gothic arch shape having a pair of upper and lower curved surfaces each of which is in rolling contact with said rolling member at one contact point.

5. The assembly of claim 1, wherein said inner guide groove is correspondingly shallow.

6. The assembly of claim 1, wherein said rolling members are balls.

7. The assembly of claim 1, wherein said second guiding means includes an endless circulating path along which said plurality of rolling members may roll indefinitely.

* * * * *